United States Patent
Mannikko

(10) Patent No.: US 6,900,397 B2
(45) Date of Patent: May 31, 2005

(54) METHOD AND APPARATUS FOR THE WEIGHING OF SHEETS OF WOOD MATERIAL

(75) Inventor: Ari Mannikko, Nastola (FI)

(73) Assignee: Metso Panelboard OY, Nastola (FI)

( * ) Notice: Subject to any disclaimer, the term of this patent is extended or adjusted under 35 U.S.C. 154(b) by 0 days.

(21) Appl. No.: 10/181,909

(22) PCT Filed: Jan. 11, 2001

(86) PCT No.: PCT/FI01/00021

§ 371 (c)(1),
(2), (4) Date: Sep. 24, 2002

(87) PCT Pub. No.: WO01/57481

PCT Pub. Date: Aug. 9, 2001

(65) Prior Publication Data

US 2003/0102168 A1 Jun. 5, 2003

(30) Foreign Application Priority Data

Feb. 1, 2000 (FI) .............................. 20000206

(51) Int. Cl.⁷ ............................................. G01G 19/00
(52) U.S. Cl. ........................ 177/83; 177/245; 177/125; 177/145; 264/40.4; 425/169
(58) Field of Search ............................. 177/83–88, 125, 177/145, 245; 264/40.4; 425/169

(56) References Cited

U.S. PATENT DOCUMENTS

| 2,939,569 A | * | 6/1960 | Roach et al. ................ 177/145 |
| 3,937,316 A | | 2/1976 | Gerhardt ................... 198/465.1 |
| 4,948,542 A | | 8/1990 | Aaberg ........................ 264/40.4 |
| 4,967,857 A | * | 11/1990 | Kent et al. ................... 177/145 |
| 5,022,532 A | * | 6/1991 | D'Urso ........................ 209/564 |
| 6,162,998 A | * | 12/2000 | Wurst et al. ................ 177/145 |

* cited by examiner

Primary Examiner—Randy W. Gibson
(74) Attorney, Agent, or Firm—Birch, Stewart, Kolasch & Birch, LLP

(57) ABSTRACT

Method and system for the weighing of sheets (6) of wood material on a sheet forming line, on which line the sheets are carried on a conveyor from a sheet forming apparatus and cooled down in a cooling turn gear comprising a cooling wheel (3) provided with radial supporters (5). The sheets (6) are weighed using a weighing system (8) which has been fitted in the cooling turn gear and which weights the sheets (6) when they are turned to an upright position or at least to a nearly upright position. The invention makes it possible to leave out the conveyor weight meter from the press line, thus allowing the press line to be made shorter. The weighing accuracy is substantially better than in a conventional conveyor weight meter solution because only the sheet itself is weighed instead of weighing the relatively heavy conveyor together with the light sheets on it.

8 Claims, 2 Drawing Sheets

METHOD AND APPARATUS FOR THE WEIGHING OF SHEETS OF WOOD MATERIAL

Figure 1:
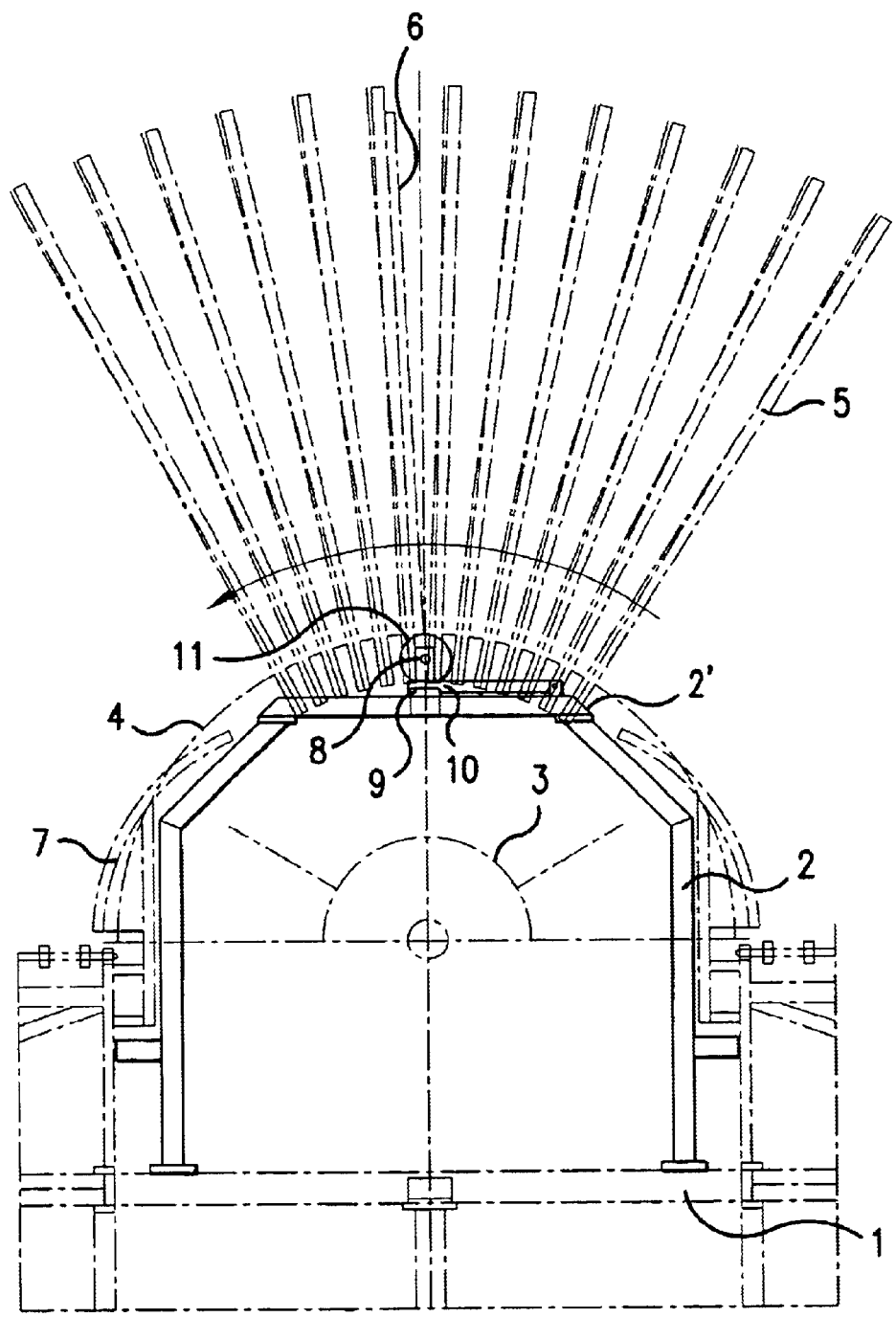

This application is the national phase under 35 U.S.C. §371 of PCT International Application No. PCT/FI01/00021 which has an international filing date of Jan. 11, 2001, which designated the United States of America.

The present invention relates to a method and an apparatus for the weighing of sheets of wood material on a sheet forming line, on which line the sheets are carried on a conveyor from a sheet forming apparatus and cooled down in a cooling turn gear comprising a cooling wheel provided with radial supporters.

Today, in press lines producing sheets of wood material, especially wood fiber board, conveyor weight meters are used for weighing the sheets. The conveyor weight meter weighs the conveyor and the sheet together. The speed of the press line has to be reduced at the weighing point.

The object of the present invention is to eliminate the drawbacks of prior-art solutions and to achieve a new method and apparatus for the weighing of sheets. According to the invention, the sheets are weighed in a cooling turn gear when the sheet has been turned to an upright position or at least to a nearly upright position. The details of the features characteristic of the method and apparatus of the invention are presented in the claims below.

Thanks to the invention, no conveyor weight meter is needed in the press line and thus the press line can be made shorter. The weighing accuracy is substantially better than in a conventional conveyor weight meter solution because only the sheet itself is weighed instead of weighing the relatively heavy conveyor together with the light sheets on it. The invention facilitates the implementation of the press line as the sheets are not weighed while they are moving on the press line conveyors and as it is no longer necessary to reduce the speed of the line to allow for weighing. In addition, the invention facilitates the modernization of factories where a continuous press is to be extended. The space that used to be occupied by the conveyor weight meter can be advantageously utilized to extend the press line without building an expensive addition. Moreover, the cooling turn gear often works in a stepwise manner, so the facts that the sheet stops moving and the vibrations damp out lead to an accurate weighing result.

One or more of these and other objects are accomplished by a method for weighing of sheets of wood based material on a sheet forming process line, the method comprising carrying the sheets on a conveyor of the sheet forming process line from a sheet forming apparatus to a cooling turn gear; cooling the sheets in the cooling turn gear, wherein the cooling turn gear includes a cooling wheel provided with radial supporters; and weighing the sheets using a weighing system which is fitted in the cooling turn gear and which weighs the sheets when they have been turned to approximately an upright position.

One or more of these and other objects are accomplished by a method wherein the weighing system comprises at least one weighing element fitted in the cooling turn gear so that, as the cooling wheel is turning, one or more sheets in a top dead center position climb onto the weighing element standing on edges of the sheets on the element, whereupon the sheets are weighed by engaging the weighing element in a weighing position, and as the cooling wheel turns further, the weighing element is released from the weighing position.

One or more of these and other objects are accomplished by a method wherein at least one weighing element is fitted in the cooling turn gear in a position above the cooling wheel so that the at least one weighing element lifts the sheets freely from supporting positions on the radial supporters to a weighing position and weighs the sheets One or more of these and other objects are accomplished by an apparatus for weighing sheets of wood based material on a sheet forming line where the sheets are carried on a conveyor from a sheet forming apparatus and turned in a cooling turn gear to cool the sheets, the cooling turn gear comprising a vertically oriented cooling wheel provided with radial supporters, a weighing system being fitted in the cooling turn gear for weighing the sheets when the sheets have been turned to a nearly upright position.

One or more of these and other objects are accomplished by an apparatus wherein the weighing system comprises at least one weighing element being fitted within an upper part of a frame of the cooling turn gear, wherein a sheet is weighed in a weighing position at the nearly upright position when the sheet is rotated by the cooling wheel, the sheet being supported by the weighing element in the weighing position and being released by the weighing element when the cooling wheel rotates the sheet past the nearly upright position.

One or more of these and other objects are accomplished by an apparatus wherein the at least one weighing element is fitted in a position above the cooling wheel and operatively lifts the sheets from the radial supporters to the weighing position to weigh the sheets.

One or more of these and other objects are accomplished by an apparatus wherein the weighing system comprises weighing elements being fitted within an upper part of a frame of the cooling turn gear, wherein a sheet is weighed in a weighing position at the nearly upright position when the sheet is rotated by the cooling wheel, the sheet being supported by the weighing element in the weighing position and being released by the weighing element when the cooling wheel rotates the sheet past the nearly upright position; a plurality of wheels, the wheels being provided upon the weighing elements; and pivoted lever arms, wherein each of the weighing elements is fastened to ends of the pivoted lever arms, the wheels operatively supporting an edge of a sheet of wood based material in the weighing position when the sheet is turned to the nearly upright position.

One or more of these and other objects are accomplished by an apparatus wherein the wheels are provided with a supporting surface formed of a rubber-like material.

In the following, the invention will be described in detail by the aid of an example with reference to the attached drawing, which presents a figure showing a cooling turn gear according to the invention in end view.

Figure 2:
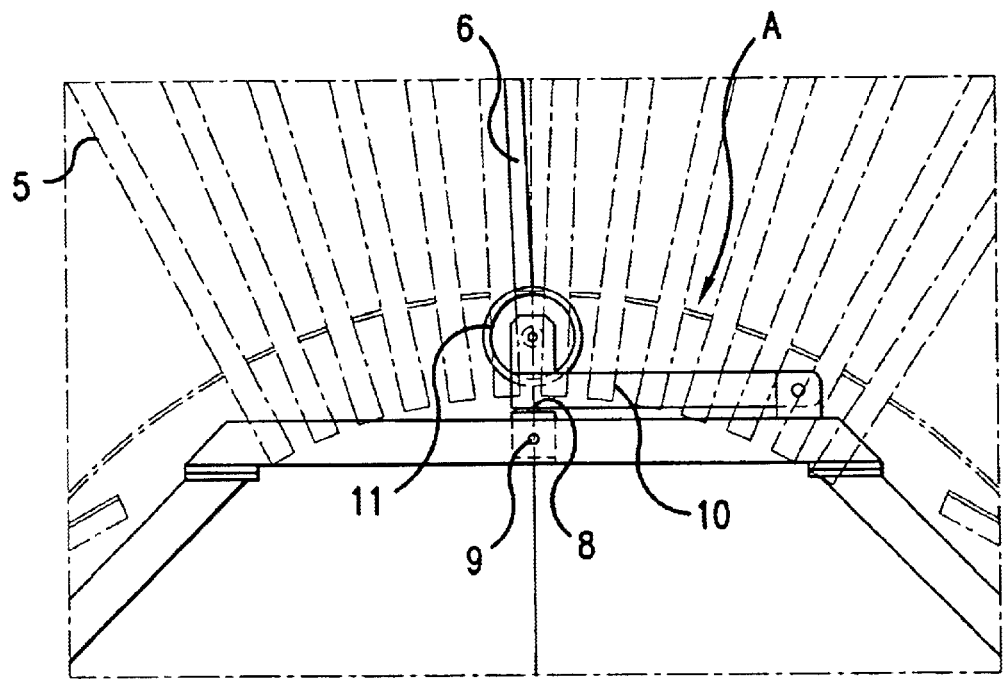

The present invention will become more fully understood from the detailed description given hereinafter and the accompanying drawings that are given by way of illustration only, wherein:

FIG. 1 is an end view of a cooling turn gear according to an embodiment of the present invention; and FIG. 2 is an enlarged view of portion of the cooling turn gear shown in FIG. 1.

Wood fiber board sheets are manufactured on a press line by pressing sheet preforms in a press or a continuous press, whereupon the sheets are sawn off to form blanks. After this, the sheets are conveyed on a conveyor into a cooling turn gear, in which the sheets are cooled down before being stacked.

The cooling turn gear comprises a frame 2 mounted on a base 1 and consisting of metal beams, e.g. three adjacent frame parts. Mounted in the frame is a cooling wheel 3, which rotates in a vertical orientation in an anti-clockwise direction as indicated by the arrow. The cooling wheel is rotated by a drive mechanism, which may consist of e.g. a squirrel-cage motor controlled by a frequency converter. The cooling wheel comprises a cylindrical barrel part 4 with radial supporting bars 5 connected to it to support the sheets 6 (the figure only shows some of the supporting bars, the entire circumference of the wheel being fitted with such bars). As the sheets enter and leave the turn gear, they are guided by curved guide bars 7.

The cooling turn gear presented in the drawing comprises a weighing system 8 fitted on the horizontal top beams 2' of the frame so as to allow the sheets 6 to be weighed when they have been turned to a nearly upright position, i.e. in a position near the top dead center of the cooling wheel 3. The weighing system 8 comprises weighing elements 9 placed upon the top beams 2' and fastened by one end to the ends of pivoted lever arms 10, and wheels 11 provided with e.g. rubber-like surface material upon the weighing elements. From the weighing elements 9, the measurement data is passed to the control system of the press line for determination of the weight of the sheets 6.

The weighing is performed as follows. As the cooling wheel 3 is turning, a sheet 6 in a top position climbs onto the wheels 11, with the edge of the sheet 6 resting on the wheels, whereupon the sheet 6 is weighed. As the cooling wheel 3 turns further, the weighing elements 9 are released and the next sheet advances to the weighing position.

If necessary, several thin sheets can be weighed at once if they are placed in the same gap between supporting bars. In this case, the average weight of the sheets can be determined.

As seen in FIGS. 1 and 2, the highest surface of the wheel 11 is slightly higher than an upper surface A of the cooling wheel 3. The highest surface of the wheel 11 is support surface for the sheet 6 being weighed and the upper surface A supports the sheet 6 when it is not being weighed.

It is obvious to the person skilled in the art that different embodiments of the invention are not restricted to the example described above, but that they can be varied within the scope of the claims presented below. The weighing can also be performed using a weighing system which is placed in a structure above the cooling wheel and which lifts the sheets off their support and weighs them.

What is claimed is:

1. A method for weighing of sheets of wood based material on a sheet forming process line, said method comprising:

carrying the sheets on a conveyor of said sheet forming process line from a sheet forming apparatus to a cooling turn gear:

cooling said sheets in the cooling turn gear, wherein said cooling turn gear includes a cooling wheel provided with radial supporters; and weighing the sheets using a weighing system which is fitted in the cooling turn gear and which weighs the sheets when they have been turned to approximately an upright position.

2. The method according to claim 1, wherein the weighing system comprises at least one weighing element fitted in the cooling turn gear so that, as the cooling wheel is turning, one or more sheets in a top dead center position climb onto the weighing element, standing on edges of said sheets on said element, whereupon the sheets are weighed by engaging said weighing element in a weighing position, and as the cooling wheel turns further, the weighing element is released from the weighing position.

3. The method according to claim 1, wherein at least one weighing element is fitted in the cooling turn gear in a position above the cooling wheel so that the at least one weighing element lifts the sheets freely from supporting positions on the radial supporters to a weighing position and weighs the sheets.

4. An apparatus for weighing sheets of wood based material on a sheet forming line where the sheets are carried on a conveyor from a sheet forming apparatus and turned in a cooling turn gear to cool the sheets, said cooling turn gear comprising:

a vertically oriented cooling wheel provided with radial supporters, a weighing system being fitted in the cooling turn gear for weighing the sheets when the sheets have been turned to a nearly upright position.

5. An apparatus according to claim 4, wherein the weighing system comprises at least one weighing element being fitted within an upper part of a frame of the cooling turn gear, wherein a sheet is weighed in a weighing position at the nearly upright position when the sheet is rotated by the cooling wheel, said sheet being supported by the weighing element in the weighing position and being released by the weighing element when the cooling wheel rotates the sheet past the nearly upright position.

6. An apparatus according to claim 4 wherein the at least one weighing element is fitted in a position above the cooling wheel and operatively lifts the sheets from the radial supporters to the weighing position to weigh the sheets.

7. The apparatus according to claim 4, wherein the weighing system comprises:

weighing elements being fitted within an upper part of a frame of the cooling turn gear, wherein a sheet is weighed in a weighing position at the nearly upright position when the sheet is rotated by the cooling wheel, said sheet being supported by the weighing element in the weighing position and being released by the weighing element when the cooling wheel rotates the sheet past the nearly upright position;

a plurality of wheels, said wheels being provided upon the weighing elements; and pivoted lever arms, wherein each of said weighing elements is fastened to ends of the pivoted lever arms, said wheels operatively supporting an edge of a sheet of wood based material in the weighing position when the sheet is turned to the nearly upright position.

8. The apparatus according to claim 7, wherein the wheels are provided with a supporting surface formed of a resilient material.

\* \* \* \* \*